Patented Apr. 24, 1928.

1,667,322

UNITED STATES PATENT OFFICE.

ALFRED T. LARSON, OF WILMINGTON, DELAWARE, ASSIGNOR TO LAZOTE, INCORPORATED, OF WILMINGTON, DELAWARE, A CORPORATION OF DELAWARE.

AMMONIA SYNTHESIS PROCESS AND CATALYST.

No Drawing.  Application filed July 30, 1925. Serial No. 47,140.

This invention relates to a catalytic process for the synthesis of ammonia, an iron-potassium-magnesium catalyst for the process, and a method of preparing the catalyst which comprises forming an intimate mixture of the oxides of the metals and treating the mixture with a hydrogen-containing gas while heating the mixture.

It is well known that iron will accelerate the reaction whereby ammonia is formed directly from its elements. None of the known forms of pure iron are capable, however, of maintaining a high catalytic activity for any appreciable length of time.

It is also known that certain substances, suitably admixed with the iron, greatly modify its catalytic power or effect. Some of these substances are known to greatly interfere with the catalytic properties of iron; in fact, some of them effectively destroy its catalytic properties. Such substances are usually referred to as "poisons" and may include such elements as sulfur, selenium, tellurium, phosphorus, arsenic, antimony, bismuth, lead, tin, boron, and the halogens and compounds of these elements.

Whereas certain substances destroy the catalytic properties of iron, other substances increase its catalytic activity and maintain it in an active condition for somewhat longer periods of time than when pure iron is used alone. Such substances have been designated as "promoters."

Various substances have been proposed from time to time as suitable "promoters" for iron catalysts. For example, it has been held that oxides of most of the metals would effectively "promote" iron catalysts. My experiments have shown however, that very few of these materials, when added singly to pure iron, lead to any practical advantage. Thus, for example, an iron catalyst prepared by burning pure iron in oxygen, crushing and screening the product and then reducing it in a nitrogen-hydrogen mixture gives an average of 3.24% ammonia at 100 atmospheres pressure, 450° C. and a space velocity of 5000. This is typical of the results obtainable with iron catalysts containing no "promoters." I have prepared catalysts consisting solely of iron and potassium oxide as a promoter and also catalysts consisting solely of iron and magnesium oxide as a promoter. I have tested such catalysts at 900 atmospheres pressure and at temperatures up to and including 750° C. When a nitrogen-hydrogen gas mixture was passed over these catalysts at the hourly rates of flow which would be required in the practical production of ammonia, for example, 50,000 volumes of the gas mixture (measured at 0° C. and one atmosphere pressure) for a unit volume of catalyst, I found that the catalyst containing potassium oxide as a promoter produced only about 3% ammonia by volume at 500° C., and that it produced at 500° C. only a trace of ammonia after having been heated to 750° C. The iron catalyst containing magnesium oxide produced under the same conditions only about 6% ammonia by volume at 500° C., and after it had been subjected to the higher temperature treatment, only about 0.1% ammonia could be formed at 500° C. (The purpose of the high temperature treatment is to accelerate the deterioration of the catalyst, and I have found that the activity of the catalyst after this treatment is a satisfactory indication of the longevity of the catalyst under normal synthesis conditions.)

Although potassium oxide and magnesium oxide, when employed separately do not satisfactorily promote an iron catalyst, I have discovered that by suitably adding to the iron both potassium oxide and magnesium oxide, wholly unexpected and most excellent results are obtained in that catalysts of this type are not only more active for the synthesis of ammonia than iron alone but also more active than a catalyst consisting solely of iron and a single oxide of an alkali metal or an alkaline earth metal. My experiments have shown that such a catalyst under conditions similar to those described for the singly promoted catalysts will give 25–30% ammonia at 500° C. and 9–10% ammonia after the 750° C. treatment, and that its activity under normal synthesis conditions is sustained for long periods of time.

In preparing my new form of iron, I have found that the mixed promoters above described may be used in variable proportions as regards both the ratio of the promoter constituents one to the other, and the ratio of total promoter content to the iron employed. Excellent results can be obtained with about 1% of potassium oxide and about 1% magnesium oxide.

The following specific examples are given to illustrate the preparation of my new form of promoted iron catalyst;

Example 1. Add approximately 1% of pure potassium oxide and 1% of pure magnesium oxide to pure ferroso-ferric oxide, the percentages being based on the total catalytic material calculated as oxides. Melt the oxide mixture, allow to cool, crush and screen to suitable size. Place the screened material in a suitable reaction tube and treat the oxide mixture with hydrogen, or with the nitrogen-hydrogen mixture employed in the synthesis, at atmospheric pressure. The reduction is started at about 400° C. The temperature is gradually increased until that temperature is reached at which it is proposed to conduct the synthesis reaction. When a nitrogen-hydrogen gas mixture under 900 atmospheres pressure, and free from catalytic poisons such as sulphur and oxygen, is passed over this reduced material at 500-550° C., practical yields of ammonia are obtained. For most purposes, the temperature of reduction of the oxide mixture is preferably maintained between 300° and 700° C.

Example 2. Prepare a solution containing approximately 95 parts of pure ferric nitrate and 5 parts of pure magnesium nitrate. To this solution add with constant stirring a dilute solution of pure potassium hydroxide. When precipitation has been completed the iron-magnesium precipitate is washed by decantation, filtered, and then slowly dried in an oven maintained at a temperature of 100-125° C. The dried mass is then crushed and screened to the desired particle size. This material is charged into a reaction tube and reduced as described in Example 1. My experiments have indicated that in this method of preparation a sufficient amount of potassia ($K_2O$) is absorbed by the iron-magnesium precipitate, and is not removed by the washing process.

The materials employed for my new form of iron catalyst may be either the oxides themselves, the metals or elements or compounds of these metals or elements which may be converted to suitable form for the catalyst. In the selection of such materials, it is important that they be free from catalyst poisons if the best results are to be obtained.

While my catalyst has been described as a mixture of iron, potassium oxide and magnesium oxide, it is possible that the catalyst consists of the elements iron, potassium and magnesium, either with or without some modicum of oxides. I do not attempt to offer any theory for the formation or the final composition of the catalyst. I have observed that with a catalyst formed by the reduction of iron and potassium oxides alone, continued use of the catalyst seems to result in a gradual loss of potassium, presumably due to a reduction of the potassium oxide and a gradual volatilization of the metallic potassium. It may be that one of the functions of the magnesium contained in my catalyst is to prevent this loss of potassium. It may be that the process of making the catalyst results in the formation of a more or less complex compound of the elements or oxides or both, which on subsequent reduction forms other compounds or mixtures.

I claim:

1. A process for producing a catalyst for the synthesis of ammonia which comprises making an intimate admixture of iron oxide, potassium oxide and magnesium oxide, forming the mixture into particles and treating the particles with a hydrogen-containing gas at a temperature of 300°–700° C.

2. A process for producing a catalyst for the manufacture of ammonia from its elements which comprises melting together iron oxide, potassium oxide and magnesium oxide, cooling the melt, forming the cooled melt into particles and treating the particles with a hydrogen-containing gas at a temperature of 300°–700° C.

3. A process for producing a catalyst for the manufacture of ammonia from its elements which comprises melting together iron oxide with about 1% potassium oxide, and about 1% magnesium oxide, cooling the melt, forming the cooled melt into particles and treating the particles with a hydrogen-containing gas at a temperature of 300°–700° C.

4. A catalyst for the manufacture of ammonia, said catalyst being the reduction product of a mixture containing an iron compound, a potassium compound and an alkaline earth metal compound, said catalyst being more active in the synthesis of ammonia than iron alone.

5. A catalyst for the manufacture of ammonia from its elements containing iron, potassium oxide and magnesium oxide, said catalyst being more active in the synthesis of ammonia than iron alone.

6. A catalyst for the manufacture of ammonia from its elements comprising iron, potassium oxide and magnesium oxide free from catalyst poisons, said catalyst being more active in the synthesis of ammonia than iron alone.

7. A catalyst for the manufacture of ammonia from its elements comprising iron with about 1% potassium oxide and about 1% magnesium oxide.

8. A catalyst for the manufacture of ammonia from its elements, comprising the product of the fusion and reduction of a mixture of iron oxide, potassium oxide and magnesium oxide, said catalyst being more active in the synthesis of ammonia than iron alone.

9. A catalyst for the manufacture of ammonia from its elements, comprising the product of the fusion and reduction of a mixture of iron oxide with about 1 per cent potassium oxide and about 1 per cent magnesium oxide.

10. A process for the synthesis of ammonia which comprises passing a mixture of nitrogen and hydrogen over an iron-potassium oxide-magnesium oxide catalyst more active in the synthesis of ammonia than iron alone at a temperature of about 500° C.

11. A process for the synthesis of ammonia which comprises passing a mixture of nitrogen and hydrogen over an iron-potassium oxide-magnesium oxide catalyst more active in the synthesis of ammonia than iron alone, at a temperature between about 400° and 700° C.

12. A process for the synthesis of ammonia which comprises passing a mixture of nitrogen and hydrogen under 900 atmospheres pressure over an iron-potassium oxide-magnesium oxide catalyst more active in the synthesis of ammonia than iron alone at a temperature of about 500° C.

13. A process for the synthesis of ammonia which comprises passing a mixture of nitrogen and hydrogen under pressure over a catalyst containing iron, a potassium compound and a magnesium compound more active in the synthesis of ammonia than iron alone, and maintained at a temperature between about 400° and 700° C.

14. A process for the synthesis of ammonia, which comprises passing a mixture of nitrogen and hydrogen over a catalyst containing iron, a potassium compound and a magnesium compound more active in the synthesis of ammonia than iron alone.

15. A process for the synthesis of ammonia, which comprises passing a mixture of nitrogen and hydrogen over an iron-potassium oxide-magnesium oxide catalyst more active in the synthesis of ammonia than iron alone.

16. A process for the synthesis of ammonia, which comprises passing a mixture of nitrogen and hydrogen over a catalyst comprising the fusion product of an iron-potassium-magnesium oxide mixture more active in the synthesis of ammonia than iron alone.

In testimony whereof I affix my signature.

ALFRED T. LARSON.